United States Patent

[11] 3,587,154

| [72] | Inventor | Howell L. Potter<br>New Britain, Conn. |
|---|---|---|
| [21] | Appl. No. | 811,954 |
| [22] | Filed | Apr. 1, 1969 |
| [45] | Patented | June 28, 1971 |
| [73] | Assignee | Textron Inc., Providence,<br>R.I. |

[54] HOLLOW BEARING BALLS
14 Claims, 10 Drawing Figs.

[52] U.S. Cl. .................................................. 29/148.4,
29/Dig. 17
[51] Int. Cl. ...................................................... B21d 53/10
[50] Field of Search............................................ 29/148.4,
(DIG.4), (DIG.3), 148.4 (B), (DIG.17), 417;
308/188; 113/120; 72/341, 365, 89, 69

[56] References Cited
UNITED STATES PATENTS

| 1,039,673 | 9/1912 | Schatz............................ | 29/148.4 |
| 1,278,914 | 9/1918 | Gruver........................... | 113/120 |
| 1,278,915 | 9/1918 | Gruver........................... | 72/341 |
| 1,514,810 | 11/1924 | Wisch............................. | 72/365 |
| 1,526,140 | 2/1925 | Gruver........................... | 72/89 |
| 1,712,446 | 5/1929 | Rutter............................ | 72/89 |
| 2,177,928 | 10/1939 | Knudsen......................... | 29/148.4 |
| 3,470,720 | 10/1969 | Eklund et al................... | 72/69 |
| 3,485,542 | 12/1969 | Krysiak .......................... | 308/188 |
| 955,698 | 4/1910 | Schatz............................. | 29/148.4 |
| 2,963,772 | 12/1960 | Niles, Sr. ....................... | 29/148.4 |

*Primary Examiner*—Thomas H. Eager
*Attorney*—Sandoe, Hopgood and Calimafde

ABSTRACT: A hollow bearing ball is made by swaging the annular end portions of a short tubular section of steel, or other suitable material, inward in a curve to bring all portions of each end edge relatively close together, and, if desired, thereafter welding all portions of each end edge together. Thus, the grain of the material in the finished ball follows the curvature of the ball to provide uniform rolling contact fatigue strength on all surface portions. Before swaging, the inside surfaces of the end portions of the tube are tapered at least enough to provide a uniform wall thickness in the finished ball, and are preferably tapered more so that the finished ball may have a relatively thick, heavier annular portion in a central plane that is normal to the axis through the swaged ends, thereby to provide a self-orienting effect controlling the annular position of the rotating ball.

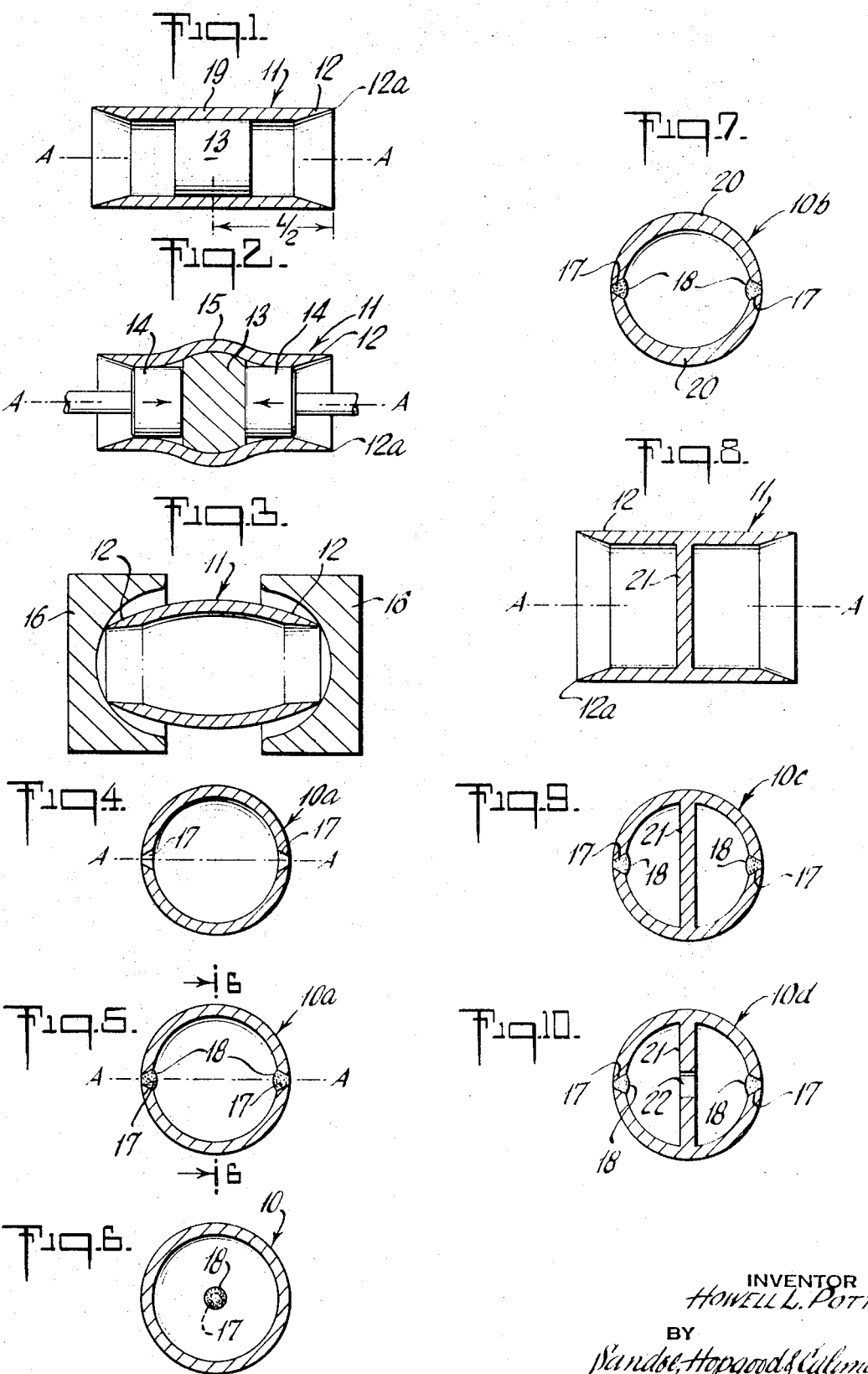

HOLLOW BEARING BALLS

The present invention relates to hollow bearing balls of steel or other suitable metal and to methods of making them.

In particular, the invention is a hollow bearing ball, and method for making it, in which the grain of the metal in the shell of the ball is oriented to follow the curvature of the outer surface of the ball. This avoids exposing the ends of the grain at any portion of the ball surface which would, because of exposed grain ends, be more susceptible to rolling contact fatigue failure than other portions at which the grain follows the surface. Thus, the entire ball surface is substantially uniformly fatigue resistant, and stresses in the shell of the ball are uniformly distributed, so that the strength, fatigue resistance and service life of the ball are enhanced.

A known method of making a hollow bearing ball is to make concave hemispheres and weld two matching hemispheres together to form a ball. The principal drawbacks of a bearing ball made in this manner are that the surface at the equatorial weld line around the ball will normally be less resistant to rolling-contact fatigue than the other surfaces of the ball, yet the flashing along the inside of the weld line inside the ball forms an annular equatorial ring of added weight which produces a gyroscope or self-orienting effect. Thus, as the ball rolls in a bearing, this gyroscope effect orients the angular position of the ball so that it tends to roll on its weld line which will normally spall more easily than other portions, thereby hastening ball failure. Moreover, if the hemispheres are machined from bar stock, the grain of the material will be at various angles to the surface of the ball, and some grain ends will be exposed at the surface, as a result of which the fatigue resistance will vary over the surface of the ball, and the stresses will be unequally distributed so that the service life and strength of the finished ball will be impaired. If, on the other hand, the hemispheres are deep drawn from flat sheet stock, some portions of the metal are stretched more than others, so that severe, unevenly distributed stresses are produced.

Another known method consists in deep drawing a round-bottomed cup from sheet stock and crowning the open end, by hammering or swaging, to complete the ball. With a ball formed in this manner, however, the metal in one portion—the deep-drawn portion—will be stretched while the metal in the other, crowned, portion will be compressed so that sharply different and unevenly distributed stresses are produced in each portion. In addition, this combination of stretching the metal in one portion of the ball and compressing it in another make it substantially impossible to achieve uniform or accurately preselected weight distribution in the finished ball, which will thus almost certainly be unevenly balanced so as to roll erratically and tend to vibrate.

A principal object of the present invention is to produce a hollow bearing ball in which the grain of the metal will be uniformly oriented to follow the curvature of the outer surface of the finished ball and with no grain ends exposed on any exterior surface. The advantages of this are that the fatigue resistance and strength of the shell of the ball are substantially uniform throughout. Moreover, with this uniform grain orientation, such unequal stresses as are produced in the formation of the ball are more readily relieved and/or uniformly distributed by annealing or otherwise heat treating the ball than is the case with balls which have different grain orientations at different portions of their shells.

Another object is to produce a hollow bearing ball which will be self-orienting about a predominant axis of rotation, relying upon a moment of inertia about said axis which exceeds the moment of inertia about any other axis through the ball center.

It is also an object to provide a bearing ball of the character indicated having the inherent capacity for self-orientation about a predominant rotational axis, such orientation promoting normal rolling contact only intermediate the swaged ends of the ball.

A further object is to provide a simple and economic method of making a hollow bearing ball having the aforementioned features and advantages.

In accordance with the invention, a hollow bearing ball is formed from a short cylindrical tubular metal section in which the grain of the metal runs substantially parallel to the longitudinal axis of the tubing. The tube is formed into a ball by swaging each annular end portion inward in a curve to bring all portions of each end edge relatively close together approximately at the longitudinal axis of the tube. If desired, the end edge portions may then be welded together at each end of the tube to form a sphere which is rough ground, heat treated and finish ball ground in the usual manner.

Due to the original parallel longitudinal orientation of the grain of the metal, and the swaging of the tube ends to bend and compact the metal, the grain of the swaged portions is oriented to follow the curvature of the outer surface so that the grain is similarly oriented to the curvature of the ball all around it, all with the aforementioned advantages.

In one embodiment of the invention, the inner surfaces of portions of the wall of the tube, from which the ball is formed, are tapered just enough from the central portion of the tube so that when the end portions are curved in and compacted by the swaging, the wall thickness of all portions of the ball thus formed with be uniform. Thus, the ball will be substantially evenly balanced relative to its center on all sides. The material which is removed from the tube wall for the tapering is removed from the inside surface so as not to disturb the orientation of the grain of the metal at the outside and so as not to expose the ends of the grain on any exterior surface of the ball.

In another embodiment, the annular end portions of the tube wall are tapered to a greater degree so that the central portion of the tube will, in the finished ball, be relatively thicker than the other portions to provide a heavier annular equatorial portion in a central plane that is normal to an axis through the swaged ends. Thus, when the ball is in motion in a bearing, this heavier annular wall portion produces a gyroscope or self-orienting effect which defines an axis of rotation through the swaged ends, so that the load is borne on the circumferential surface substantially at the said normal plane, that is, angularly spaced from the swaged ends. In this way, the swaged ends are not subject to wear, even if these ends are welded, and the load-bearing surface is reinforced by the extra wall thickness which produces the gyroscope effect.

In still another embodiment, this gyroscope effect is provided by a radial wall integral with the central part of the bore of the undeformed tube.

Further objects, advantages and features of bearing balls of this invention, and of the method of making them, will be apparent from the following detailed description of illustrative embodiments shown in the accompanying drawings in which:

FIG. 1 is a cross-sectional view longitudinally through a short tube from which a hollow bearing ball is made in accordance with this invention and showing a slug of relatively incompressible but readily deformable material placed in the tube to facilitate shaping;

FIG. 2 is a view similar to the view of FIG. 1 showing the slug axially compressed to deform radially outwardly, for initial shaping of the tube, prior to the swaging step;

FIG. 3 is a view similar to the views of FIGS. 1 and 2 showing hemispherically concave swaging dies utilized to swage the end portions of the tube inward as a step in forming a hollow bearing ball;

FIG. 4 is a view similar to the views of FIGS. 1 to 3, showing the tube after completion of the swaging step;

FIG. 5 is a cross-sectional view through one form of hollow bearing ball in accordance with this invention;

FIG. 6 is a cross-sectional view, taken in the plane 6—6 of FIG. 5;

FIG. 7 is a sectional view through another form of bearing ball embodying the invention;

FIG. 8 is a cross-sectional view longitudinally through a short tube of modified construction, for making another form of bearing ball in accordance with this invention;

FIG. 9 is a sectional view similar to the view of FIG. 8 showing the ball formed by swaging and welding; and FIG. 10 is a view similar to the view of FIG. 9 showing a modified form wherein the disc in the ball has a central hole therethrough.

Referring to the drawings, bearing balls embodying the invention—illustrated by bearing balls 10a–10bb–10c–10d in FIGS. 5, 7, 9 and 10 respectively—are made from a short tube 11 of metal, such as steel, in which the grain is uniformly oriented parallel to the axis of the tube. Each annular end portion 12 of the tube is swaged inward in a curve to gather all portions of each end edge 12a relatively close together at approximately the longitudinal axis A–A of the tube.

To facilitate the shaping of the ball by the swaging, a slug 13 of relatively incompressible yet ready deformable material, such, as lead, rubber, oil, sand and the like is placed in the central portion of the tube prior to the swaging step. Then, as illustrated in FIG. 2, pressure is applied simultaneously to opposite sides of the slug 13 in the directions of the axis A–A of the tube by appropriate rams, indicated by pressure rams 14, so that the material of the slug is forced to flow or otherwise deform radially outwardly against the central portion of the tube wall. Sufficient pressure is applied for the pressure transmitted by the slug to bulge the tube wall outward as indicated at 15, to start the shaping of the tube into a ball. While the use of a slug 13 and this ramming step are not essential, they are useful for assuring the formation of smooth, accurate curves by the swaging, particularly if the tube 11 is relatively thin walled. In any event, the bulge 15 thus formed has, across the tube, an outside diameter which is smaller than the desired ultimate ball diameter (i.e., diameter desired for the ball formed by the swaging step) and is larger than the outside diameter of the tube 11 prior to deformation. After forming the bulge 15, slug 13 is removed, and the removed material may be salvaged for successive like operations.

As illustrated in FIG. 3, the swaging is suitably performed by a pair of cooperating, hemispherically concave swaging dies 16 which are moved together to crown or head inward the end portions 12 of the tube to produce a sphere in the form shown in FIG. 4 in which the edge portions at each end of the tube are gathered in close together to leave a small opening 17 at opposite sides of the sphere thus formed. If necessary—for example, for large-size tubes to be formed into large-size balls or for tubes of still material—the swaging may be facilitated by preheating the tubes to a suitable forging temperature by any appropriate means, such as by induction heating.

When the swaging is complete, the interior of the sphere formed by the swaging is of course free of slug material. The ball has the appearance shown in FIG. 4, i.e., with openings 17 on the initial tubular axis A—A. If desired, these openings may be closed by electron-beam welding. The welds thus formed are indicated at 18 in FIGS. 5, 6, 7, 9 and 10. Thereafter, the welded sphere is rough ball ground, heat treated and finish ball ground to complete the bearing ball.

The swaging step compacts and thickens the walls of the end portions 12 of the tube, and if the undeformed tube walls were of uniform thickness from end to end, the sphere produced by the swaging would have thicker, and hence relatively heavy wall portions at the opposite longitudinal ends, i.e., as viewed along axis A–A. This represents an undesirable distribution of mass, for it is a stated object of the invention to have the predominant moment of inertia about the rotational axis, shown as A–A in the drawings. To achieve this object the undeformed tubular member 11 is precharacterized with axial end portions of reduced wall thickness, thereby minimizing mass concentration near the openings 17.

Preferably, the reduced end mass is achieved by tapering the thickness of the end portions 12 of the tube wall from the central portion 19 outward to the end edges 12a as illustrated in FIG. 1. This taper is shown as a substantial fraction of the undeformed tubular half length L/2. Thus, upon swaging, the wall of the sphere formed by the swaging will be characterized by lesser thickess at the axial ends (axis A–A). The end portions 12 are tapered by removing as by milling, grinding or other suitable means, material from the inside surfaces of the tube wall so as not to cut across, and thereby expose ends of, the grain of the material of the tube, at the outer cylindrical surface of the tube.

In the case of the described wall thickness relationship, there is inherently achieved a maximum moment of inertia of the ball about its desired nominal rotation axis A–A. This inherently assures self-orientation in use, and minimizes the chances of rolling contact near the swaged ends.

In certain cases, it will be desired to have no predominant sense of maximum moment of inertia, e.g., moment of inertia substantially the same, however viewed. In such cases, the tapered construction which has been described will of course be provided to a lesser degree, so that upon swaging compaction, the net wall thickness development becomes substantially uniform over the entire ball; and the weldments at 18 merely complete the uniform wall thickness development.

In my experience, using a tubular member 11 machined from 52–100 bar stock of 25/32-inch outside diameter and 1 9/16-inch long, and 15/32-inch bore, each end taper extends about one-third the half length L/2, if a ball of substantially uniform thickness is to be produced (15/16-inch diameter, after finish grinding). Greater counterboring at the end tapers (or the provision of a smaller central bore), will produce the desired ball which is self-orienting about the axis A–A.

FIGS. 5 and 6 show a bearing ball 10a for which the walls of the initial tube 11 were tapered just enough so that the wall thickness is substantially uniform on all sides. Thus, bearing ball 10a will roll substantially at random so that, in a given period, the entire spherical surface will be subject to the same amount of use.

FIG. 7 illustrates a bearing ball 10b for which the walls of the tube 11 that it was made from were tapered to an extent sufficient to leave an annular thicker wall portion 20 (corresponding to the central portion 19 of the tube wall) around an equatorial circumference in a central plane normal to the axis A–A. The thicker, and hence heavier, wall portion 20 thus produces a self-orienting effect, promoting rolling contact at the thicker equatorial portion 20, rather than at the swaged end regions. The thicker annular wall portion 20 not only determines the greatest mass and moment of inertia in the plane of the load-bearing zone of the ball, but also provides greatest support for the load.

FIGS. 8 and 9 illustrate another means for providing the desired self-orientation in a bearing ball 10c. For this embodiment, a disc may be fixed as by welding at the center of the tube 11 in a plane normal to the axis A–A; however, I prefer that the central section or wall 21 shall be integral with the bore of tube 11, as shown. As in the other embodiments, the end portions 12 of the tube wall are preferably tapered to avoid having the portions of the wall adjacent to the welds 18 heavier than any other portions. Then, after swaging as illustrated in FIG. 9, the wall 21 provides the extra mass at the central plane normal to the axis A–A, to create the desired self-orienting effect. The wall 21 thus defines and, at the same time, reinforces the load-carrying zone. As an additional refinement of this embodiment, a hole, indicated at 22 in FIG. 10, may be made centrally through the wall 21, the size of the hole being carefully selected as means for adjusting the desired mass-distribution relationships within the finished ball. The selection of the hole size provides means for adjusting the size of the ball contact ellipse, when supported in bearing races; such ellipse is a function of the deflection character of the ball under load. It will be appreciated that whether or not the wall reinforcement of FIGS. 9 or 10 is used, the invention provides for uniform deflection throughout the rolling motion of the ball, under load, and that by reason of the self-orientation feature, the grain elongation will uniformly characterize predominantly major axis alignment of the contact ellipse.

It will be appreciated that the above embodiments, and the specific manner of performing the steps of the methods described above are illustrative and not limiting, and that some modifications may be made in the described structure, arrangement, materials and method steps without departing from the scope of the invention as defined by the following claims:

I claim:

1. A method of making a hollow bearing ball, comprising selecting a cylindrically tubular member in which the grain of tube material is substantially uniformly oriented to run parallel with the axis of the tube, swaging each tubular end inwardly in a curve to bring all portions of each end edge relatively close together approximately at the axis of the tube, and thereafter spherically finishing the product of swaging deformation.

2. The method of claim 1, in which all portions of each end edge are closed prior to spherical finishing.

3. The method of claim 2, in which the closure of end edges includes a welding step.

4. The method of claim 1, in which the annular ends of the undeformed tube are made thinner by removing material from the interior wall surfaces of said portions.

5. The method of claim 1, in which the annular wall thickness of the undeformed tube is tapered from the central region to the respective ends by removing material from the interior wall of the tube, the tapering and relative thinness of the wall at the ends being such that after the tapered ends have been swaged and, thereby, compressed and thickened, the wall of the ball formed from said central region will be at least as thick as the wall formed from said tapered ends.

6. The method of claim 5, in which said tapering and relative thinness of the wall of the undeformed tube are such that, after swaging, the wall formed from said ends will be thinner than the wall formed from said central region, thereby to determine a maximum moment of inertia about the initial tube axis.

7. The method of claim 1, in which the central region of the tube is circumferentially uniformly expanded prior to swaging at the axial ends.

8. The method of claim 7, in which said expansion is achieved by placing within said central region a slug of relatively incompressible and readily deformable material and then axially compressing said slug to an extent developing the desired expansion.

9. The method of claim 1, in which the undeformed tube is characterized by a radial wall at the central region.

10. The method of claim 9, in which said wall is integral with the tube.

11. The method of claim 9, in which said radial wall has a central hole of a size selected in accordance with the desired degree of deflection of the ball under load.

12. A hollow bearing ball formed by swaging inward in a curve each end portion of a short piece of a metal tube in which the grain of the metal is oriented substantially parallel to the longitudinal axis of the tube to bring all portions of each end edge of said piece relatively close together approximately at the longitudinal axis of the tube whereby the grain of metal in said end portions is oriented to follow said curve and converge toward said axis.

13. The bearing ball of claim 12, in which the wall thickness in the central radial plane, after swaging deformation, is at least as thick as substantially all other wall portions.

14. The bearing ball of claim 13, in which the said central wall thickness is thicker and heavier than all other wall portions, whereby the axis of the tube determines the self-orienting axis of ball rotation.